United States Patent

[11] 3,624,562

[72] Inventor Noriaki Fujimura
Tokyo, Japan
[21] Appl. No. 21,053
[22] Filed Mar. 19, 1970
[45] Patented Nov. 30, 1971
[73] Assignee Fujitsu Limited
Kawasaki, Japan
[32] Priority Mar. 26, 1969
[33] Japan
[31] 44/22860

[54] AUTOMATIC EQUALIZER FOR RANDOM INPUT SIGNALS
5 Claims, 9 Drawing Figs.

[52] U.S. Cl. .......... 333/18, 333/70 T
[51] Int. Cl. .......... H04b 3/04
[50] Field of Search .......... 333/18, 70 T

[56] References Cited
UNITED STATES PATENTS

| | | | |
|---|---|---|---|
| 3,368,168 | 2/1968 | Lucky .......... | 333/18 |
| 3,445,771 | 5/1969 | Clapham et al. .......... | 333/18 X |
| 3,479,458 | 11/1969 | Lord et al. .......... | 333/18 X |
| 3,508,153 | 4/1970 | Gernish et al. .......... | 333/18 X |

*Primary Examiner*—Herman Karl Saalbach
*Assistant Examiner*—Paul L. Gensler
*Attorneys*—Curt M. Avery, Arthur E. Wilfond, Herbert L. Lerner and Daniel J. Tick

ABSTRACT: Input signals to a transversal filter are made random by the scrambler which is provided at the sender side. The transversal filter includes multipliers. A correlation detector having filters is connected to the transversal filter. A descrambler connected to the transversal filter converts the equalized random signals provided by the transversal filter into signals which are similar to the input signals. A connector connects the filters of the correlation detector to the multipliers of the transversal filter to control the multipliers by control signals produced by the filters.

AUTOMATIC EQUALIZER FOR RANDOM INPUT SIGNALS

DESCRIPTION OF THE INVENTION

The invention relates to an automatic equalizer. More particularly, the invention relates to an automatic equalizer for data transmission.

In the transmission of signals for the transmission of data via a transmission line, the signals are influenced by delay distortion of such transmission line, or the like. This results in distortion of the waveform and in the occurrence of intersymbol interference. When the signal transmission speed is greater, compared with the bandwidth of the transmission line, the intersymbol interference causes error in the data signals. Therefore, when the transmission speed is high, it is necessary to compensate for the intersymbol interference of the received symbol by utilizing a suitable equalizer.

A conventional transversal filter, which is a filter whose transmission properties exhibit a periodic symmetry, has the disadvantage that its adjustment is complicated. The filter must be readjusted each time the transmission line is changed. Furthermore, the adjustment is not simple. This requires that the adjustment be made automatic, before a transversal filter may be utilized generally. Various systems have been utilized for the automatic adjustment of a transversal filter.

In one automatic adjustment system for a transversal filter, single data pulses having a sufficiently long time interval are transmitted as a pilot signal. At the receiver, the values of the pilot signal waveforms which have passed through the transversal filter at the other sampling point, are detected and the multiplying factor constant of the multiplier is automatically adjusted and fixed so that said values may become zero. After the termination of the adjustment, data signals are transmitted.

The adjustment system is defective, since a specific pilot signal is required for the adjustment of the multiplier. Therefore, pilot signals and data signals must be switched in the initial stage of the data transmission. The system is also defective, since the valve of the multiplier is fixed after the adjustment. This prevents a gradual change of the characteristics of the channel to be followed during the data transmission.

Another known filter adjustment system detects the error of the output signals of a transversal filter and makes the adjustment so that the error may become zero. When the signals are not distorted, said signals may have only a plurality of predetermined finite values, and the difference between the value of the input signal and the predetermined value closest to said value is made the signal error. Adjustment is then undertaken so that the error may become zero. This system is defective, since the distortion of the input signal must be small, to some extent. There is a very great possibility that the levels of the signals will be misjudged and result in maladjustment, particularly when there are a large number of levels of the signals.

The principal object of the invention is to provide a new and improved automatic equalizer.

An object of the invention is to provide an automatic equalizer for a transversal filter which eliminates the disadvantages of known equalizers.

An object of the invention is to provide an automatic equalizer for a transversal filter which requires no pilot signal.

An object of the invention is to provide an automatic equalizer for a transversal filter which is able to follow the variation of characteristics of the channel.

An object of the invention is to provide an automatic equalizer for a transversal filter which is able to provide adjustment without error even when the number of levels of the signals is very great.

An object of the invention is to provide an automatic equalizer for a transversal filter which is effective, efficient and reliable in operation.

In accordance with the invention, an automatic equalizer comprises input means for providing input signals which are made random by the scrambler and sent from the sender side. A transversal filter has multiplier means and is connected to the input means. A correlation detector has filter means and is connected to the transversal filter. A descrambler connected to the transversal filter converts the equalized random signals provided by the transversal filter into signals which are mutually correlated similar to the input signals. A connector connects the filter means of the correlation detector to the multiplier means of the transversal filter thereby controlling the multiplier means by control signals produced by the filter means.

The transversal filter further comprises a combining circuit and each of the correlation detector and the descrambler is connected to the combining circuit of the transversal filter.

In accordance with the invention, an automatic equalizer comprises input means for providing input signals which are made random by a scrambler and sent from the sender side. A transversal filter comprises a delay line connected to the input means. The delay line has a plurality of outputs. Each of a plurality of multipliers is connected to a corresponding one of the outputs of the delay line for automatically adjusting the output signals in the output under the control of control signals. A combining circuit connected to the multipliers combines the outputs of the multipliers. A correlation detector comprises a delay line connected to the combining circuit of the transversal filter. The delay line has a plurality of outputs. One of the outputs is central to the others. A polarity discriminator is connected to the one of the outputs. A plurality of product circuits are connected in common to the polarity discriminator and each is connected to a corresponding one of the outputs of the delay line for multiplying the output signals in the output by a multiplier supplied by the polarity discriminator. Each of a plurality of filters is connected to a corresponding one of the product circuits. The filters have a common output connected in common to the multipliers of the transversal filter for supplying control signals to the multipliers. A descrambler is connected to the output of the combining circuit of the transversal filter for converting the equalized random signals provided by the transversal filter into signals which are similar to the signals in the scrambler provided at the sender side.

The filters of the correlation detector are low-pass filters.

In order that the invention may be readily carried into effect, it will now be described with reference to the accompanying drawings, wherein:

FIG. 1 is a block diagram of a known type of transversal filter;

FIGS. 2*a*, 2*b* and 2*c* are graphical presentations of waveforms appearing in a transversal filter;

Figure 1:
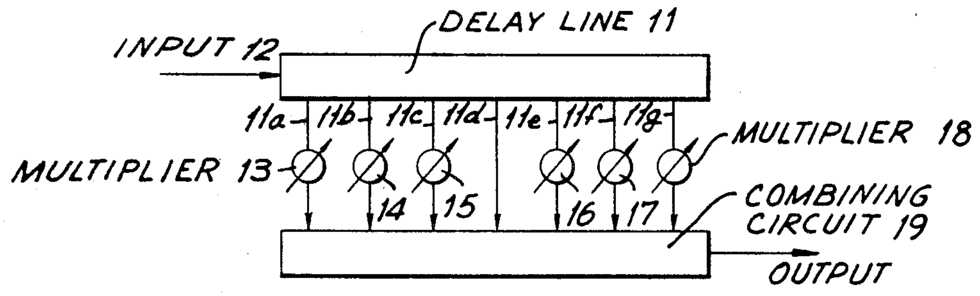
FIG. 1 PRIOR ART

A known type of transversal filter is shown in FIG. 1. Input signals are supplied to a delay line 11 via an input lead 12. The delay line 11 has a plurality of outputs 11*a*, 11*b*, 11*c*, 11*d*, 11*e*, 11*f* and 11*g*. The signals provided at the outputs of the delay line 11 are supplied to corresponding ones of a plurality of multipliers, except for the signal in the output 11*d*.

The signal in the output 11*a* of the delay line 11 is supplied to a multiplier 13. The signal in the output 11*b* of the delay line 11 is supplied to a multiplier 14. The signal in the output 11*c* of the delay line 11 is supplied to a multiplier 15. The signal in the output 11*e* of the delay line 11 is supplied to a multiplier 16. The signal in the output 11*f* of the delay line 11 is supplied to a multiplier 17. The signal in the output 11*g* of the delay line 11 is supplied to a multiplier 18.

The multipliers 13 to 18 adjust the amplitude and polarity of the signals provided at the outputs 11*a* to 11*c* and 11*e* to 11*g* of the delay line 11. The multipliers 13 to 18 are connected to a combining circuit 19 which combines the signals provided by said multipliers.

Each of the multipliers 13 to 18 provides a product of the input signal, derived from the corresponding output of the delay line 11 and a constant. The constant, which is the multiplier, is a suitable value between +1 and −1. The multiplier or multiplying factor is variable. Each of the multipliers 13 to 18 is set or adjusted to a suitable value corresponding to the characteristics of the transmission line.

Figure 2A:
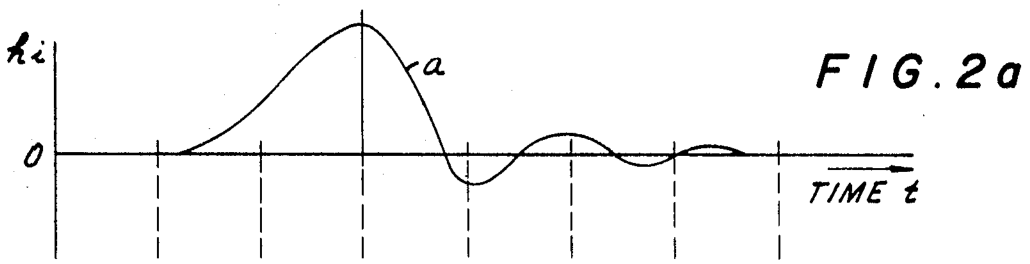
Figure 2B:
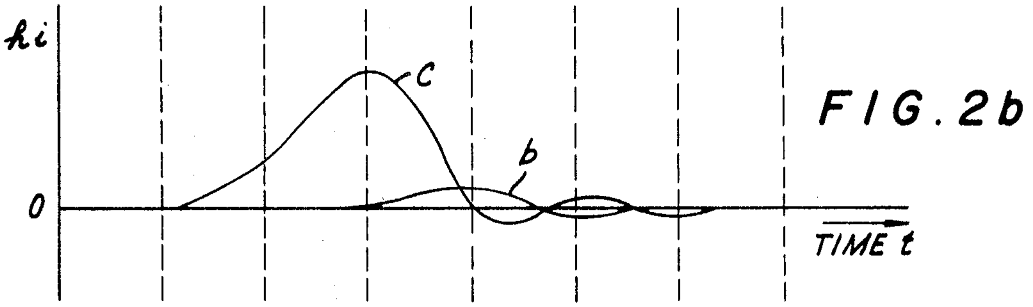
Figure 2C:
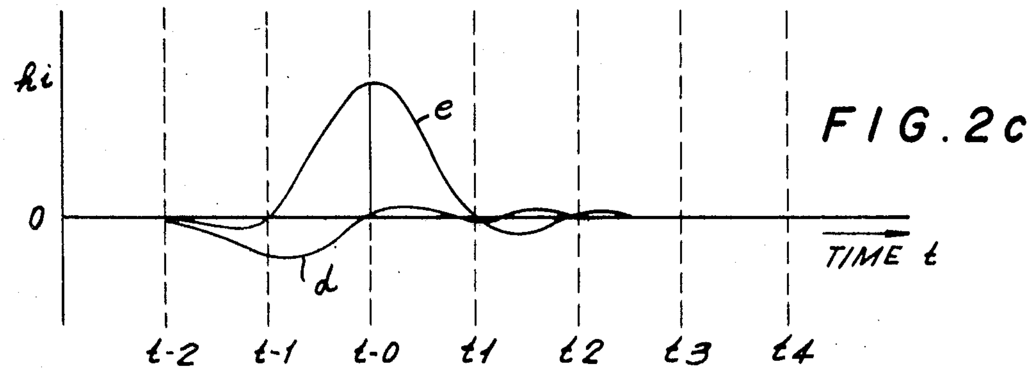

In each of FIGS. 2*a*, 2*b* and 2*c*, the abscissa represents the time $t$ and the ordinate represents the amplitude. FIG. 2*a* illustrates the waveform of a single input data pulse. In the actual transmission of signals, the single data waveform shown in FIG. 2*a* is successively transmitted at a time interval having various values during transmission, and said signals are overlapped. The transversal filter is required to convert the waveforms of the input signals (FIG. 2*a*) into waveforms having no intersymbol interference, that is, waveforms in which a data pulse is not influenced by another data pulse at the sampling point. In other words, one data pulse must be zero at the sampling point of another pulse.

The desired waveform is shown in FIG. 2*c* as the curve *e*. The input signal waveform *a* of FIG. 2*a* may be converted into the waveform *e* of FIG. 2*c* in the following manner. The value at the adjacent sampling point $t1$ may be first be made zero by adding a waveform *b* (FIG. 2*b*) to the curve *a*. The waveform *b* may be provided by delaying a suitable value, via a multiplier, for the time of a pulse interval.

The waveform *c* (FIG. 2*b*) is provided by the addition of the waveforms *a* and *b*. The value of the waveform *c* at the point $t1$ is zero, since the waveforms *a* and *b* cancel each other out at such point. Similarly, the waveform at the point $t$-1 may be made zero by adding a waveform *d* (FIG. 2*c*) to the waveform *c* of FIG. 2*b*. Thus, by properly adjusting the multipliers 13 to 18, and overlapping, in the combining circuit 19, the signals derived from said multipliers, the waveforms of the single output data pulses may be made zero at $tk$, wherein $k$ is ±1, ±2, ... .

Figure 3:
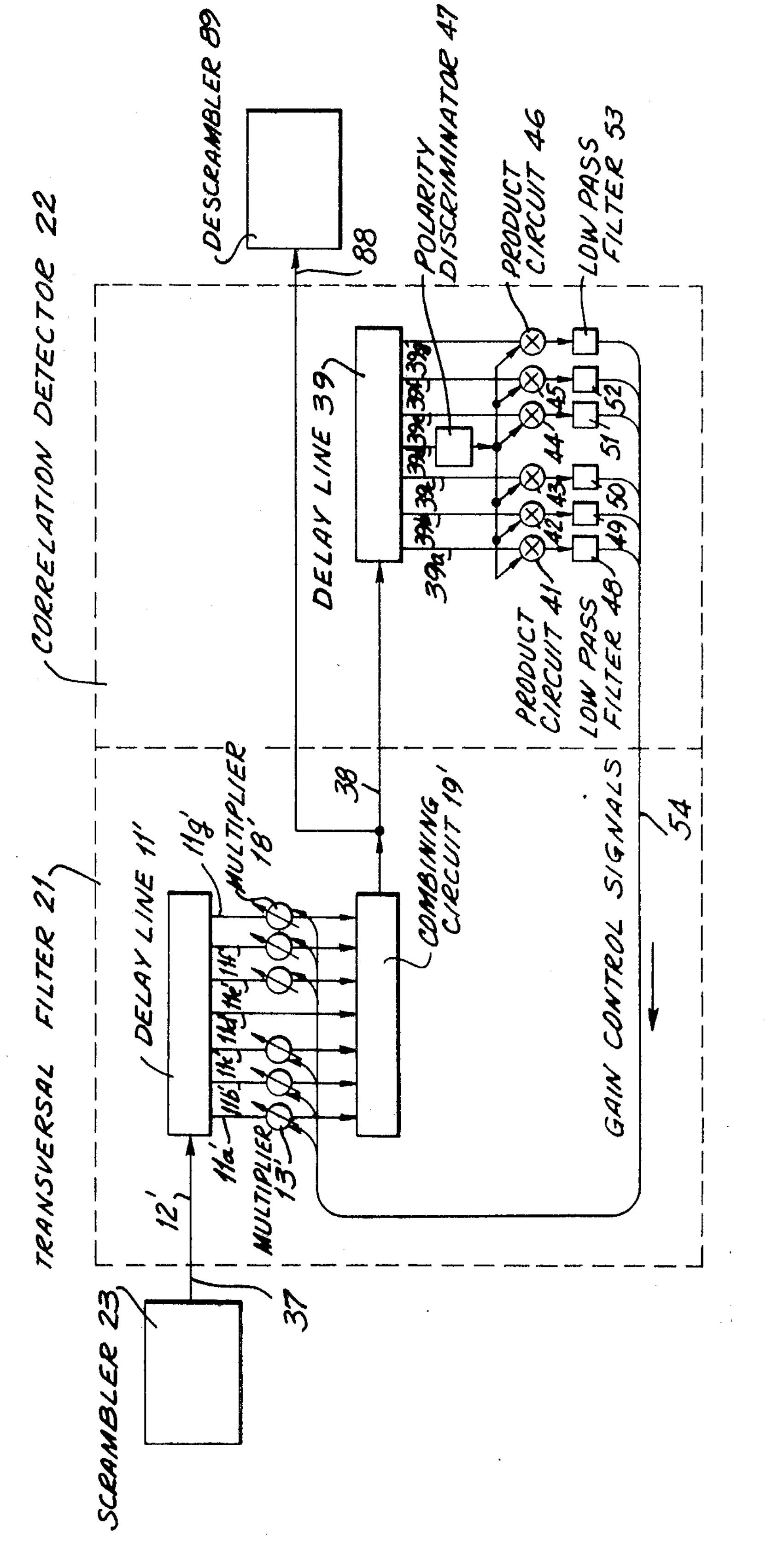
FIG. 3 is a block diagram of an embodiment of the automatic equalizer of the invention for a transversal filter.

FIG. 3 is a block diagram of an embodiment of the automatic equalizer of the invention. The automatic equalizer comprises a transversal filter 21 and a correlation detector 22. The transversal filter is similar to the known type of transversal filter shown in, and described with reference to, FIG. 1. The only difference between the transversal filter of FIG. 1 and the transversal filter 21 of FIG. 3 is that in the transversal filter 21, the multipliers 13′ to 18′ automatically adjust the multiplier or multiplying factor by suitable control signals. Furthermore, the input signals supplied to the automatic equalizer of FIG. 3 must be data signals which are made random; that is, data signals which are not mutually correlated. Such data signals may be provided by a scrambler 23, provided at the sender side and connected to the input of the delay line 11′ through the transmission line 12′.

Figure 6:
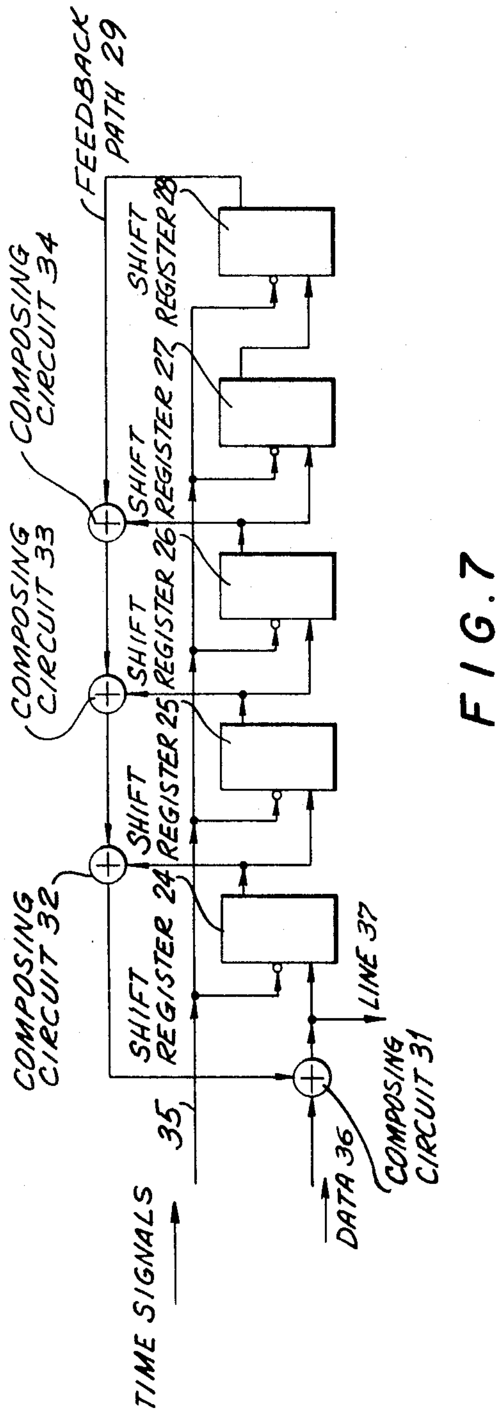
FIG. 6 is a block diagram of the scrambler by which the input signals to the input means of the automatic equalizer of FIG. 3 is made random at the sender side.

A scrambler circuit is shown in FIG. 6. The scrambler circuit of FIG. 6 comprises a plurality of shift registers 24, 25, 26, 27 and 28, a feedback path 29 and a plurality of composing circuits 31, 32, 33 and 34. Each of the composing circuits 31, 32, 33 and 34 comprises an exclusive OR gate. The shift registers 24, 25, 26, 27 and 28 are driven by time signals supplied via a common lead 35. A data sequence is supplied to FIG. 6 via an input lead 36. The data sequence is added to the contents of the bits preceding the input signals stored in the shift registers 24 to 28 in accordance with arithmetic operations. The arithmetic operations are defined by $$0+0=1+1=0$$

$0+1=1+0=1$ in the exclusive OR gate or composing circuits 31 to 34.

The result of the addition is derived from an output lead 37 as a line sequence. The output signals do not have the correlation which the input signals might have, because such output signals are a composite output of instantaneous input information pulses and signals fed back through the composing circuits 32, 33 and 34 and the composing circuit 31. The output signals via lead 37 are sent from the sender side and supplied to the transversal filter 21 of the automatic equalizer through the transmission line 12′ of FIG. 3.

In FIG. 3, the output of the transversal filter 21 is supplied to the correlation detector 22 as an input, via a lead 38. The signals supplied to the correlation detector 22 are supplied to a delay line 39 of said correlation detector. The delay line 39 has a plurality of outputs 39*a*, 39*b*, 39*c*, 39*d*, 39*e*, 39*f* and 39*g*. A plurality of product circuits 41, 42, 43, 44, 45 and 46 are provided in the correlation detector 22 of FIG. 3.

The output 39*a* of the delay line 39 is connected to the product circuit 41. The output 39*b* of the delay line 39 is connected to the product circuit 42. The output 39*c* of the delay line 39 is connected to the product circuit 43. The output 39*e* of the delay line 39 is connected to the product circuit 44. The output 39*f* of the delay line 39 is connected to the product circuit 45. The output 39*g* of the delay line 39 is connected to the product circuit 46. The signals in the inputs of the delay line 39 are supplied to the corresponding product circuits as multiplicands.

The output 39*d* of the delay line 39 is connected to a polarity discriminator 47. The polarity discriminator 47 functions to discriminate or determine the polarity of the signal in the output 39*d* of the delay line 39. The output signals provided by the polarity discriminator 47 are supplied to each of the product circuits 41, 42, 43, 44, 45 and 46 as multipliers. In each of the product circuits 41 to 46, the output of the polarity discriminator 47 is added to the signal in the corresponding output of the delay line 39.

The products or output signals provided by the product circuits 41 to 46 are supplied to a plurality of low-pass filters 48, 49, 50, 51, 52 and 53. The output of the product circuit 41 is connected to the low-pass filter 48. The output of the product circuit 42 is connected to the low-pass filter 49. The output of the product circuit 43 is connected to the low-pass filter 50. The output of the product circuit 44 is connected to the low-pass filter 51. The output of the product circuit 45 is connected to the low-pass filter 52. The output of the product circuit 46 is connected to the low-pass filter 53. The low-pass filters 48 to 53 function to remove the high-frequency components of the signals and to average said signals.

The output signals from the low-pass filters 48 to 53 are mutually correlated and are supplied to the multipliers 13′ to 18′ of the transversal filter 21, as multiplying or gain control signals, via a suitable feedback path 54. In FIG. 3, though a suitable feedback path 54 is indicated as a single path, it has plural paths and via each of the plural paths the low-pass filters 48 to 53 are connected to the multipliers 13′ to 18′. The automatic equalizer of FIG. 3 thus functions as a feedback system, and such system is controlled in a manner whereby the correlated values may become zero.

Although only signals within the circuit of the automatic equalizer of the invention have been hereinbefore described, the principle of operation of the equalizer will now be described. It is assumed that the transversal filter 21 is not yet sufficiently adjusted and that the waveform of the output signal of said transversal filter, that is, the transmission output and the single input data pulses supplied to the correlation detector 22, is as shown in FIG. 2*a* and that the value at the time instant $ti$, which is the sampling point, is $hi$. It is also assumed that the time instant $t\,0$ is the sampling point of the data pulse, that is, the control point of the pulse waveform.

In the actual transmission of data, the data pulse is multiplied by $dk$. The magnitude $dk$ is the value of the data of the $k^{th}$ pulse. In order to maintain simplicity of illustration, it is assumed that the magnitude $dk$ is either +1 or −1. The signal in the output 39*d* of the delay line 39 of the correlation detector 22 of FIG. 3 is supplied to the polarity discriminator 47 and the output of said polarity discriminator 47 is assumed to be *di*.

If the signal in the $j^{th}$ output of the delay line 39 of the correlation detector 22 of FIG. 3, counting leftward from the central output 39*a*, is *Xij*, such magnitude *Xij* at the sampling point may be expressed as $$Xij=\sum_{k=-\alpha}^{\alpha} hi+j-k\ dk \qquad (1)$$

Each of the product circuits 41 to 46 produces the product of *Xij* and *di*. The output of each of the product circuits 41 to 46 is averaged by the corresponding one of the low-pass filters 48 to 53. Each of the low-pass filters 48 and 53 produces an output *Yj* which may be expressed as $$Yj=\overline{Xij\ di}=\sum_{k=-\alpha}^{\alpha} \overline{hi+j-k\ dk\ di} \qquad (2)$$

On the other hand, if it is assumed that the signals which have been transmitted are made random $\overline{dk\ di}$ may be expressed as $$\overline{dk\ di}=\begin{cases}1 & k=i\\ 0 & k\neq i\end{cases} \qquad (3)$$

This means that the output of each of the filters 48 to 53 represents the residual distortion of the single data pulse.

Figure 4:
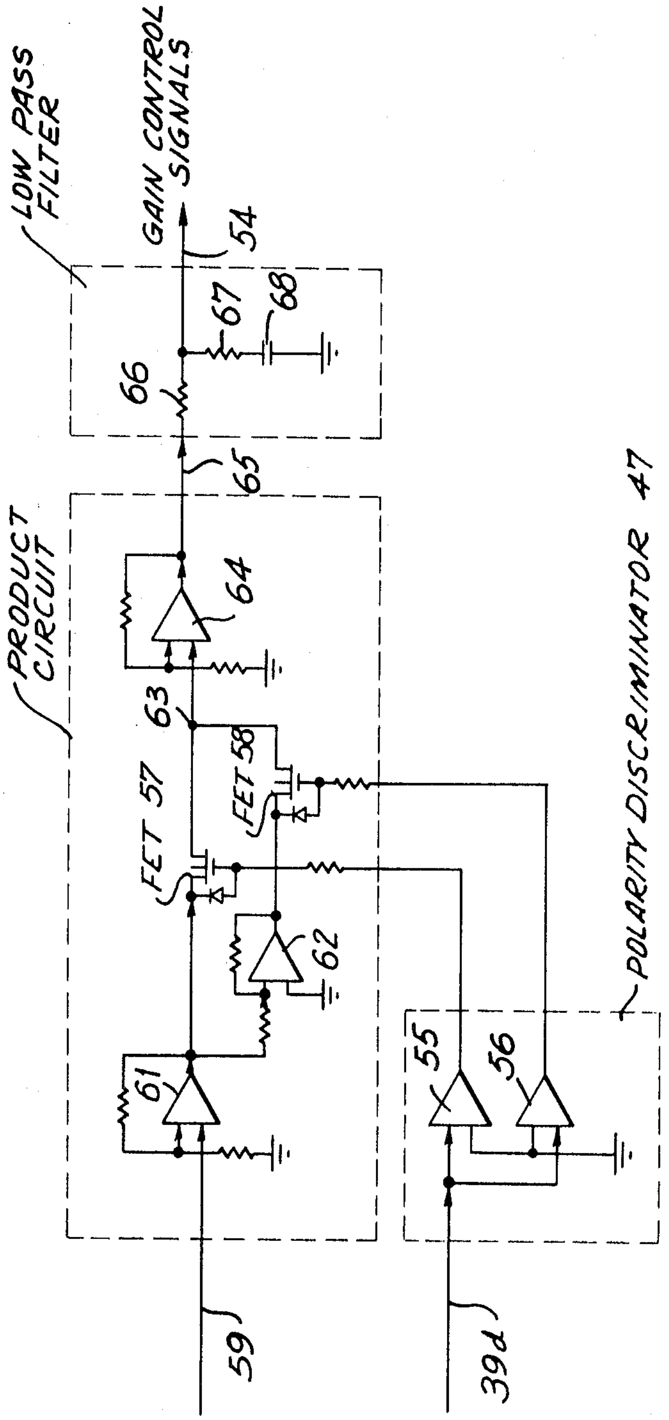
FIG. 4 is a circuit diagram illustrating a polarity discriminator, a product circuit and a low-pass filter of the correlation detector of the automatic equalizer of FIG. 4.

The circuit of the polarity discriminator 47, one of the product circuits 41 to 46 and one of the low-pass filters 48 to 53 are shown in FIG. 4. The input signals to the polarity discriminator 47 are supplied via the output 39*d* of the delay line 39. The output 39*d* of the delay line 39 is connected to the input of an operational amplifier 55 and to an input of another operational amplifier 56. Each of the operational amplifiers 55 and 56 of the polarity discriminator 47 has a sufficiently large gain. When the input signal to the polarity discriminator 47 is a positive potential, the output of the operational amplifier 55 becomes negative and switches an analog gate to its conductive condition via an FET 57 and the output of the operational amplifier 56 becomes positive and switches an analog gate to its nonconductive condition via an FET 58. When the input is a negative potential, the output of the operational amplifier 55 becomes positive and switches an analog gate to its nonconductive condition via the FET 57 and the output of the operational amplifier 56 becomes negative and switches an analog gate to its conductive condition via the FET 58.

On the other hand, signals in the other outputs of the delay line 39 are supplied to the corresponding product circuit via a lead 59. The input signals in the lead 59 are supplied to an input of a buffer operational amplifier 61. The output of the operational amplifier 61 is supplied both to the FET 57 and to an operational amplifier 62. The operational amplifier 62 converts or multiplies the signal supplied thereto by −1. The output of the operational amplifier 62 is supplied to the FET 58.

Each of FET 57 and 58 is connected as an analog gate and, as hereinbefore described, the switching of such analog gates to their conductive and nonconductive conditions is determined by the output of the polarity discriminator 47. The outputs of the two analog gates are combined at a circuit point 63. The combination signal at the circuit point 63 is supplied to an input of a buffer operational amplifier 64. When the FET 57 is in its nonconductive condition and the FET 58 is in its conductive condition, the output of the operational amplifier 61 is directly supplied to the input of the operational amplifier 64.

When the FET 57 is in its conductive condition and the FET 58 is in its nonconductive condition, the polarity of the output of the operational amplifier 61 is inverted and then supplied to the input of the operational amplifier 64. That is, the input signal in the lead 59 is multiplied by the polarity, which is +1 or −1, of the signal in the lead 39*d*. The output of the operational amplifier 64 is supplied to a corresponding one of the low-pass filters via a lead 65. The low-pass filter comprises a pair of resistors 66 and 67 and a capacitor 68. Thus, by adjusting the corresponding one of the multipliers 13′ to 18′ of the transversal filter 21, so that the output *Yj* of the corresponding one of the low-pass filters 48 to 53 may become zero in accordance with equation 4, residual distortion *hj* of the data pulses may be made zero as a result, and the adjustment may be accomplished and the output of the combining circuit 19′ may be provided.

The principle of operation of each of the multipliers 13′ to 18′ of the combining circuit 19′ of FIG. 3 is described in detail with reference to the circuit arrangement of FIG. 5. Signals in a corresponding output of the delay line 11′ are supplied to the multiplier via a lead 69. The signals in the input lead 69 are supplied to an input of a buffer operational amplifier 71. The output of the operational amplifier 71 is supplied to a bridge circuit. The bridge circuit comprises a pair of thermistors 72 and 73 and a pair of resistors 74 and 75. The output of the bridge circuit is the difference in voltage between a pair of output leads 76 and 77.

The gain of the bridge circuit is varied by the resistance value of the thermistors 72 and 73 and may be controlled by varying the heater currents of said thermistors. Gain control signals are supplied to the multiplier via the lead 54 from the low-pass filters 48 to 53. The gain control signals are supplied to an input of a buffer operational amplifier 78 and control the heater current of the thermistors 72 and 73.

Figure 5:
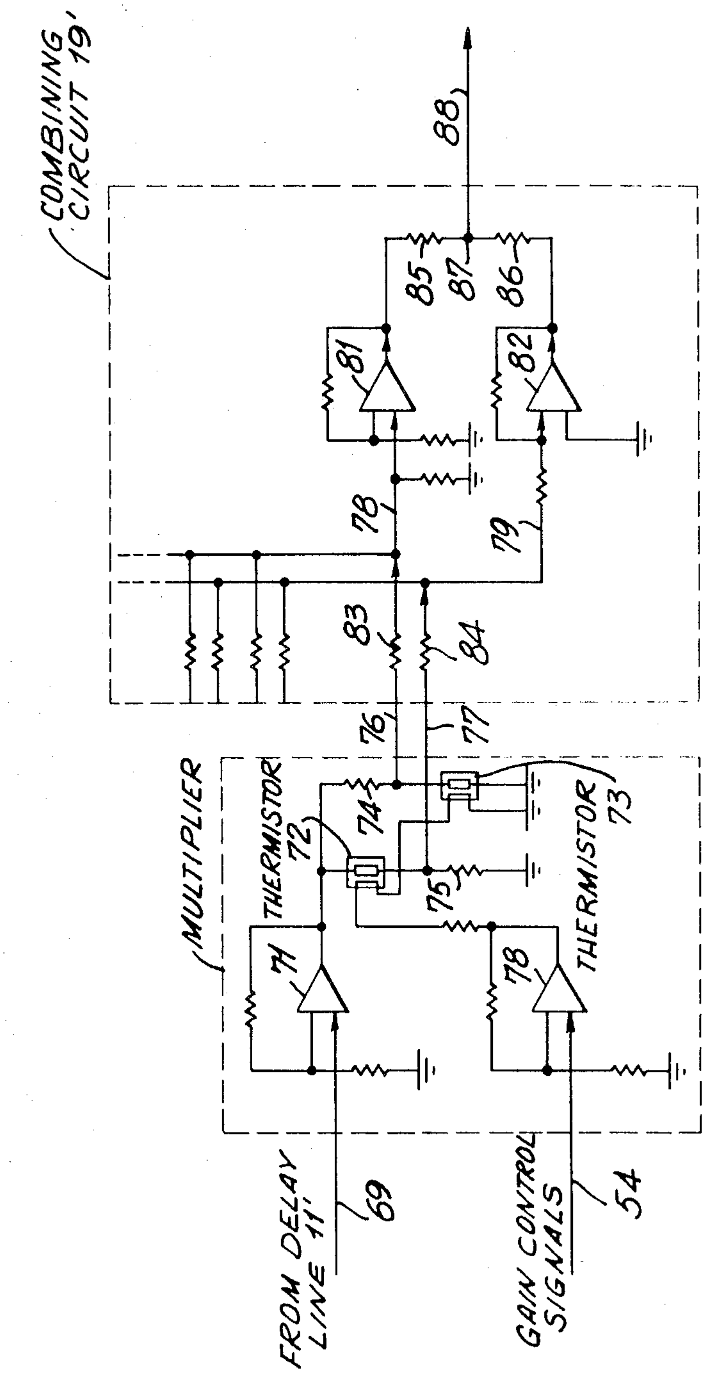
FIG. 5 is a circuit arrangement of a multiplier and a combining circuit of the automatic equalizer of FIG. 3.

The combining circuit 19′ to 18′ (FIG. 3) provides the difference between the voltages of the output leads 76 and 77 of the corresponding multiplier (FIG. 5). The signals in the leads 76 and 77 are supplied to input leads 78 and 79 of operational amplifiers 81 and 82, respectively, via resistors 83 and 84, respectively. The signals provided by the other multipliers are supplied via resistors and are also combined in the leads 78 and 79 of the combining circuit 19′. The outputs of the operational amplifiers 81 and 82 are combined, via corresponding resistors 85 and 86, at a circuit point 87.

The gain of the operational amplifier 81, combined with its feedback circuit, is positive, and the gain of the operational amplifier 82, combined with its feedback circuit, is negative. The absolute values of the gains of the operational amplifiers 81 and 82 are equal. Therefore, a voltage proportional to the difference between the voltages in the leads 78 and 79 is provided in an output lead 88. When the output in the output lead 88 is completely adjusted, the operation of the correlation detector 22 of FIG. 3 is terminated and said output signal is transmitted as the output of the automatic equalizer.

Figure 7:
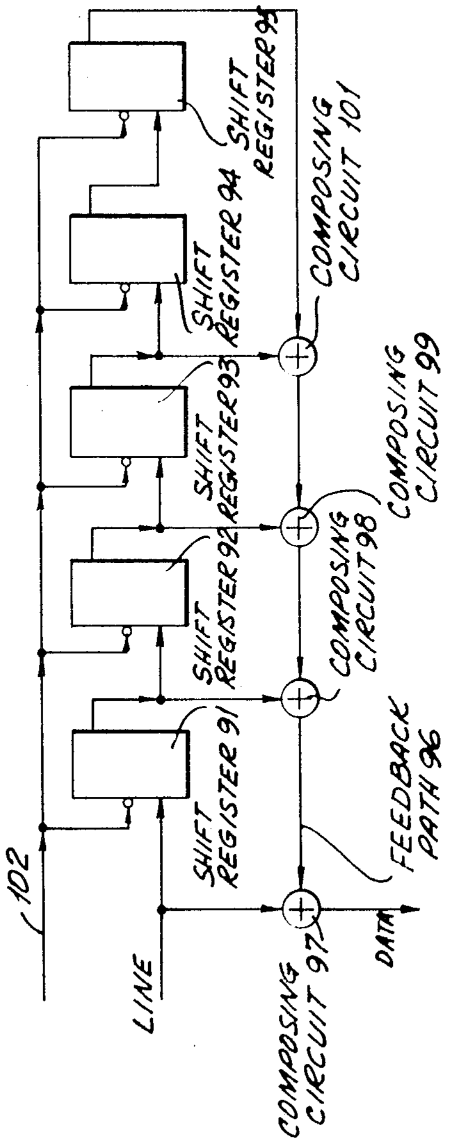
FIG. 7 is a block diagram of the descrambler connected to the output of the automatic equalizer of FIG. 3.

Since the data signals are made random by the scrambler 23 (FIG. 3) before they are supplied to the delay line 11′, so that the output signal in the output lead 88 is also random, it is necessary to convert said output signals into the original signals by mutual correlation in a descrambler 89 (FIG. 3). The circuit arrangement of the descrambler 89 of FIG. 3 is shown in FIG. 7. The descrambler of FIG. 7 comprises a plurality of shift registers 91, 92, 93, 94 and 95, a feedback path 96 and a plurality of composing circuits 97, 98, 99 and 101. Each of the composing circuits 97, 98, 99 and 101 comprises an exclusive OR gate. The shift registers 91, 92, 93, 94 and 95 are driven by time signals in a lead 102.

Unnecessary signals are included in the data signals in the output signal of the automatic equalizer of FIG. 3. Thus, as in the case of the scrambler provided at the sender side, the output line sequence provided by said equalizer is added to the line sequence of the bit next-preceding said output line sequence in the exclusive OR circuits in order to eliminate the unnecessary line sequence and obtain the original line sequence.

Although the number of signal levels is two, that is, +1 and −1, in the present example adjustment may be satisfactorily accomplished in the same manner when the number of signal levels is greater than two. As hereinbefore described, in accordance with my invention, an automatic equalizer combines a correlation detector, comprising a delay line having a plurality of output, a polarity discriminator, a plurality of product circuits and a plurality of low-pass filters, with a transversal filter. The multipliers of the transversal filter are automatically controlled by the output signals of the correlation detector. This permits the accomplishment of complicated adjustment and the automatic correction of correlation distortion of codes instantaneously varied due to the characteristics of the transmission line. The automatic equalizer of my invention thus is of considerable advantage from a practical viewpoint. In the foregoing explanation, it has been stated that a scrambler is connected to the sender side and a descrambler is connected to the output side of an automatic equalizer of the present invention, but this makes it a condition that the input signals of an automatic equalizer of this invention are made random. If the original signals at the sender side are already made random, neither scrambler nor descramber are required.

While the invention has been described by means of a specific example and in a specific embodiment, I do not wish to be limited thereto, for obvious modifications will occur to those skilled in the art without departing from the spirit and scope of the invention.

I claim:

1. An automatic equalizer for random signals, comprising input means for providing input signals; scrambler means provided for making the input signals random; a transversal filter comprising a delay line connected to said scrambler means, said delay line having a plurality of outputs, a plurality of multipliers each connected to a corresponding one of the outputs of said delay line for automatically adjusting the output signals of the delay line in said outputs under the control of control signals, and a combining circuit connected to said multipliers for combining the outputs of said multipliers; a correlation detector comprising a delay line connected to the combining circuit of said transversal filter, said delay line having a plurality of outputs, one of said outputs being central to the others, a polarity discriminator connected to said one of the outputs of the last-mentioned delay line, a plurality of product circuits connected in common to said polarity discriminator and each connected to a corresponding one of the outputs of the last-mentioned delay line for multiplying the output signals in each output by a multiplier supplied by said polarity discriminator, and a plurality of filters each connected to a corresponding one of said product circuits, said filters having a common output connected to the multipliers of said transversal filter for supplying the control signals to said multipliers; and descrambler means connected to the output of the combining circuit of said transversal filter for converting the equalized random signals provided by said transversal filter into signals which are mutually correlated.

2. An automatic equalizer as claimed in claim 1, wherein the filters of said correlation detector are low-pass filters.

3. An automatic equalizer for random signals, comprising a transversal filter comprising a first delay line having a plurality of output taps, a plurality of multipliers connected to the output taps of the first delay line for automatically adjusting the outputs of the first delay line by control signals, and a combining circuit connected to the multipliers for combining the outputs of the multipliers; and a correlation detector comprising a second delay line connected to the combining circuit, said second delay line having a plurality of output taps, a polarity discriminator connected to one of the output taps of the second delay line, a plurality of product circuits, and a plurality of low-pass filters connected to the other output taps of the second delay line through the product circuits, the polarity discriminator having an output connected to the product circuits and the low-pass filters having outputs connected to the multipliers of the transversal filter whereby the outputs of the low-pass filters are utilized as the control signals for adjusting the outputs of the first delay line.

4. An automatic equalizer as claimed in claim 3, wherein the first delay line has an input, and further comprising scrambler means connected to the input of the first delay line for making incoming signals random.

5. An automatic equalizer as claimed in claim 3, wherein the combining circuit of the transversal filter has an output, and further comprising descrambler means connected to the output of said combining circuit for converting equalized random signals into mutually correlated signals.

* * * * *